United States Patent
Brunson

(10) Patent No.: US 6,663,153 B2
(45) Date of Patent: Dec. 16, 2003

(54) REMOVABLE ATTACHMENT DEVICE FOR TAPE MEASURE

(76) Inventor: Mark E. Brunson, 4227 Co. Rd. 13 W., Bellefontaine, OH (US) 43311

( * ) Notice: Subject to any disclaimer, the term of this patent is extended or adjusted under 35 U.S.C. 154(b) by 0 days.

(21) Appl. No.: 10/022,971

(22) Filed: Dec. 13, 2001

(65) Prior Publication Data

US 2002/0185877 A1 Dec. 12, 2002

Related U.S. Application Data

(60) Provisional application No. 60/326,502, filed on Sep. 29, 2001, and provisional application No. 60/296,600, filed on Jun. 7, 2001.

(51) Int. Cl.[7] .............................. B25J 15/06; G01B 3/10
(52) U.S. Cl. ............................ 294/65.5; 294/2; 33/770
(58) Field of Search ................................ 294/65.1, 1.1, 294/2, 24; 24/563; 33/758, 760, 770; 7/164, 901

(56) References Cited

U.S. PATENT DOCUMENTS

| | | | | |
|---|---|---|---|---|
| 748,174 A | * | 12/1903 | Dunlea ......................... 33/770 |
| 1,020,916 A | * | 3/1912 | Lanier ......................... 248/214 |
| RE14,947 E | * | 9/1920 | Ballou .......................... 33/758 |
| 4,353,167 A | | 10/1982 | Martin ....................... 33/137 R |
| 4,813,729 A | * | 3/1989 | Speckhart .................. 294/65.5 |
| 4,827,622 A | | 5/1989 | Makar .......................... 33/770 |
| 5,402,583 A | | 4/1995 | Komura ........................ 33/758 |
| 5,600,894 A | * | 2/1997 | Blackman et al. ............. 33/758 |
| 5,894,677 A | * | 4/1999 | Hoffman ....................... 33/758 |
| 6,056,339 A | * | 5/2000 | Berger ........................ 294/65.5 |
| 6,073,983 A | | 6/2000 | Schroeder ................... 294/65.5 |
| 6,349,483 B1 | * | 2/2002 | Dodge, Sr. .................... 33/770 |
| 6,370,790 B1 | * | 4/2002 | Stenger ......................... 33/758 |
| 6,442,863 B1 | * | 9/2002 | Poineau et al. ................ 33/758 |

* cited by examiner

*Primary Examiner*—Dean J. Kramer
(74) *Attorney, Agent, or Firm*—David A. Greenlee

(57) ABSTRACT

A compact, lightweight and small removable device enhances the operation and utility of a tape measure when measuring metallic or nonmetallic structures. The device comprises a flat base, a small, powerful rare earth magnet secured to one side of the base, and a spring clip that extends from a bottom edge of the base and up its other side and includes a curved surface normally contacting the base to provide a pocket having an entrance slot for insertion of the zero hook. The zero hook is clamped between the base and the spring clip when inserted through the entry slot into the pocket. The small powerful magnet enables use with metallic surfaces behind wallboard, and above, below and beside the zero hook. A plurality of friction enhancing tangs extend from the spring clip in a direction opposite the magnet for gripping nonmetallic surfaces. The device can also be used to retrieve remote metal tools and other objects. The device is selectively and easily manually attached to and removed from the zero hook, and easily stored in a worker's pocket.

6 Claims, 1 Drawing Sheet

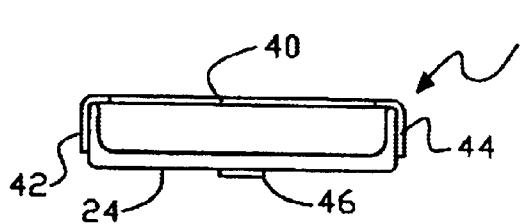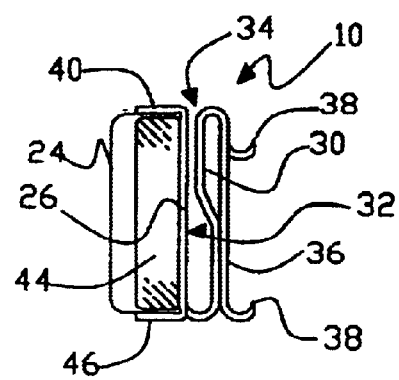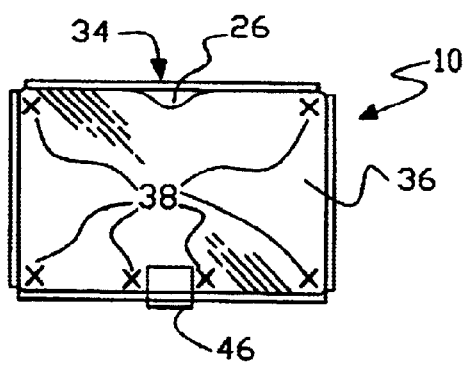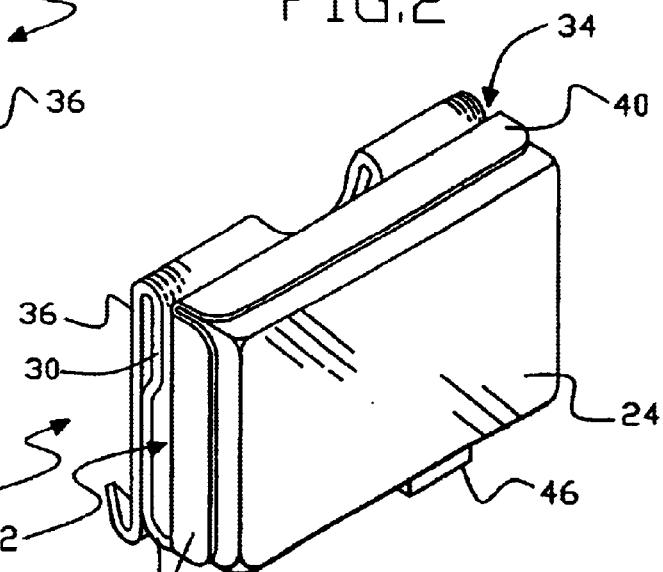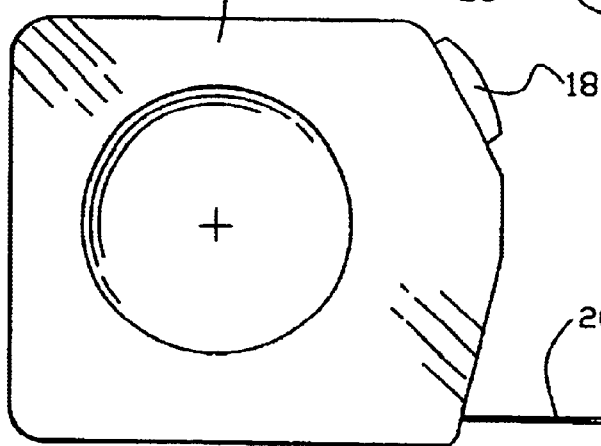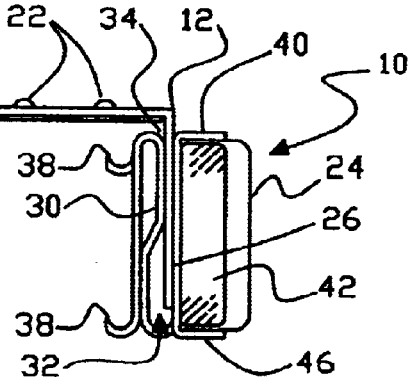

REMOVABLE ATTACHMENT DEVICE FOR TAPE MEASURE

RELATED APPLICATIONS

This application claims priority of Provisional Patent Applications No. 60/296,600, filed Jun. 7, 2001, and No. 60/326,502, filed Sep. 29, 2001.

BACKGROUND OF THE INVENTION

1. Technical Field

This invention relates generally to extensible tape measures and, more specifically, to a removable attachment for enhancing measuring performance of such a tape measure.

2. Description of the Prior Art

For years it has been the quest of workers to be able to perform the most amount of work with the fewest and lightest tools, and without needing assistance from a co-worker. This is the most cost-efficient and time-efficient way of completing jobs.

Spring-loaded extensible and retractable tape measures have been used for many years by workers, such as carpenters and other construction tradesmen, as well as by homeowners, who are have a need to measure distances during construction projects. These projects can include rough carpentry, drywall installation, flooring and roof installation. These tape measures are very compact, when compared to yardsticks and folding rules, and come in various lengths (e.g. 6-foot, 12-foot, 25-foot, 50-foot tapes) to accommodate the workers; needs. Metal tapes are used and are curved to enable extension for several feet without bending under its own weight. The zero hook of the conventional tape measure is a right-angle steel tip that is riveted to the end of the tape.

In measuring a board to be cut, it is common practice to place the zero hook of the tape over the edge of a board and walk away, while extending the tape from its reel a desired distance, and then lock the lock the tape against spring retraction. All too often the zero hook will slip off the end of the board, requiring the worker to do it all over again, often necessitating use of a helper hold the end to assure accurate measurement. This is very wasteful of a worker's time.

In measuring drywall, there is often no edge over which the zero hook can be hooked, such as when a distance from a corner is being measured. In this case it is necessary to extend the tape and pressure the zero hook into the corner, while extending the tape. In many instances, the distance is so great that the tape will buckle. This, again, requires the use of a helper to assure accurate measurement. Often the worker must work alone and on a ladder, which makes accurate measurement difficult.

Many commercial buildings use metal studs and metal doorframes from which measurements must be made. Since the metal is smooth, the zero hook often slips off the doorframe. Also, the solo worker on the ladder problem also exists.

In order to facilitate the thousands of measurements taken by workers, attempts have been made to provide tape measures with attachment devices on the ends of tapes which enhance performance of the tape measure. These include adding a friction enhanced surface on one side of the zero hook, as disclosed in U.S. Pat. No. 5,402,583—Komura.

It has also been proposed to provide a ceramic magnet that is slidably affixed to a tape near its end to secure it to adjacent metallic structures, as disclosed in U.S. Pat. No. 4,827,622—Makar. Makar's device is bulky, not removable, and has no provision for enhancing performance when used with wood and other nonmetallic structures. Yet another is a large magnet that is clamped on the end of a tape, as shown in U.S. Pat. No. 4,353,167—Martin. Martin's device is removable, but is large and quite bulky. Its magnet is useful only parallel to the tape, and cannot function on a surface perpendicular to the tape. Again, there is no provision for enhancing use with nonmetallic structures.

Another problem encountered by workers is the necessity of climbing down from a ladder or roof to retrieve a tool that has been dropped or that the worker forgot to take with him. There are various forms of wands and other, devices that mount magnets and are used to retrieve magnetic objects from inaccessible places. These, however, are length-limited, a problem addressed in U.S. Pat. No. 6,073,983—Schroeder. He provides a housing containing a ceramic or alnico magnet that may be slipped over the end of a tape, turning the tape measure into a retrieval tool that is extended to magnetically latch onto a remote metal tool, which is then reeled in by retracting the tape. This is a bulky specialty item and no utility to assist in measuring is disclosed. To be useful, this obviously heavy and bulky device would have to be carried around by the worker for the rare and occasional time of its use. It would seem to be more of a nuisance than an aid for a worker.

These devices which use magnets are bulky and are clamped or permanently attached to the tapes. Their enhancements are either to improve friction of the zero hook or to add a ceramic or alnico magnet that clamps onto the tape. All are either bulky, complex or do not materially enhance use of a tape measure by a worker, while enabling the worker to retrieve remote metal tools.

Thus there is a need for a device that can be easily attached to any conventional tape measure to enhance its use by a worker when secured to or adjacent metallic and non-metallic objects, is useful to retrieve remote metal tools, and may be easily detached and carried in a worker's pocket when its use is not needed.

SUMMARY OF THE INVENTION

It is therefore an object of this invention to a device that can be easily attached to any conventional tape measure to enhance its use by a worker when secured to or adjacent metallic and non-metallic objects, is useful to retrieve remote metal tools, and may be easily detached and carried in a worker's pocket when it is not needed.

This invention features a small, lightweight device which enhances the use of a tape measure in varying conditions. It has a base that mounts a rectangular rare earth magnet on one side and a spring clip on the other side for attachment to the zero hook of the tape. The spring clip also mounts tangs which are useful for gripping wood, block, concrete, drywall and other non-metallic surfaces. Both the spring clip and magnet are oriented perpendicular to the tape. The magnet enables the zero hook to remain immobilized adjacent a ferrous metallic structure to enable accurate measurement. The magnet is preferably made of a rare earth material which enables use of a small, thin, lightweight magnet that is powerful enough to hold through drywall, to be used to retrieve remote metallic tools, and to use with a metallic surface positioned above, below, or beside the zero hook.

A worker merely clips the device of this invention onto the zero hook and immediately, his tape measure is transformed into a versatile, multi-purpose tool. It can be used to measure long distances, single-handedly, on metal, wood or plastic. Or it can be used to retrieve remote metal tools, without having to descend from a ladder or a roof. When it is not needed, it can be easily slipped off and pocketed. It is light and compact, and never a burden to carry. Since it is removable, a single device can be used with any number of inexpensive tape measures, and, since it is not integral, it needn't be thrown away when a tape measure breaks or becomes otherwise inoperative.

Further objects and features of this invention will become more readily apparent upon reference to the following detailed description of a preferred embodiment, as illustrated in the attached drawings, in which:

BRIEF DESCRIPTION OF THE DRAWINGS

FIG. 1 is a front view of the device of this invention;

FIG. 2 is a side view of the device of FIG. 1;

FIG. 3 is a rear view of the device of FIGS. 1 and 2;

FIG. 4 is a perspective view of the device of FIGS. 1–3; and

FIG. 5 is a side view of the device of FIGS. 1–4 clipped onto the zero hook of a tape measure.

DETAILED DESCRIPTION OF A PREFERRED EMBODIMENT

The device 10 of this invention, shown in FIGS. 1–4, clips onto the angled zero hook 12 of any spring-reel extensible tape measure 14, as shown in FIG. 5. The exemplary tape measure shown typically has a metal or plastic case 16, a lock button 18, and a steel tape 20 of varying lengths (i.e. 6-foot, 12-foot and 25 foot tapes) that is extensible from case 16, where it is locked against retraction by a spring (not shown) within housing 16. Zero hook 12 is conventionally secured by rivets 22 to the distal end of tape 20.

In normal use, a worker slips zero hook 12 over the end of a board or metal structural member, the tape is stretched the desired distance, then locked, and the measured distance is marked by the worker. Frequently, the smooth steel zero hook slips off the board, requiring re-measurement or, most often, soliciting the help of an associate to hold the zero hook in place. Also, steel tape 20 is usually laterally curved to provide structural strength so that the tape can be extended a certain distance without buckling. This enables the worker to extend the tape without moving to place the zero hook. However, this distance is often greater than this distance, requiring movement, often after descending a ladder, to secure the zero hook.

In a normal workday, a worker frequently finds himself in a remote position (e.g. on a ladder or a roof) in need of a tool in a remote location. This occurs when the worker forgets to take the tool with him, or a new need arises, or the worker drops the tool off a roof, for example. He must then descend and retrieve the tool, which is time consuming and frustrating.

Others have developed devices, detailed above, which attempt to address one of these problems. However, for the reasons given, none have been commercially accepted. To assist workers who frequently encounter these everyday frustrations, Applicant invented the illustrated device 10. It comprises a small, powerful rare earth magnet 24, which is preferably a neodymium (Nd—Fe—B) magnet, but could also be a samarium (Sm—Fe—Co) magnet.

These magnets are quite powerful, when compared to alnico or ceramic or common iron or flexible (strontium ferrite bonded in a polymer) magnets, but suffer from several perceived drawbacks. They are very expensive, very brittle (fracture easily), and are difficult to machine. Applicant, however, has developed a technique for using these rare earth magnets to produce the durable and economic device of this invention. Prototypes have logged hundreds of hours without breakage.

Device 10 comprises a base 26 that mounts magnet 24 on its front side and has a spring clip 28 extending from its bottom edge, as viewed in the drawings, which extends up the rear side of base 26. Spring clip 28 has a curved surface 30 that is normally biased into contact with base 26 to create a pocket 32 and create an entry slot 34. A flat surface 36 depends from the end of spring clip 28 and includes six projecting tangs 38. As illustrates, base 26, spring clip 28 and flat plate 36 are all integral, and are stamped from a single piece of steel, with the tangs 38 being lanced out during stamping, that is heat treated to provide the spring force that biases spring slip 28 into contact with base 26. Obviously, it could comprise a combination of plastic and steel parts or high-strength plastic. For economy and ease of manufacture the illustrated arrangement is preferred.

To cradle magnet 24 and protect it from impact, which could chip or fracture it, base includes integral arms 40, 42, 44, 46 which grip the four edges of magnet 24. Applicant has found that this arrangement adequately protects magnet 24 from any angled or edge impact that could fracture it, and provides a strong backing that prevents any puncture-type impacts.

As shown in FIG. 5, device 10 is easily installed on the angled blade of zero hook 12 is projected into entry slot 34 to force curved surface 30 away from the back of base 26 and allow entry into pocket 32. The spring force of spring clip 28 frictionally holds the device onto zero hook 12. As installed, magnet 24 lies perpendicular to tape, as does flat plate 36, so that they enhance the function of zero hook 12 in securing it in a desired location against accidental dislodgement.

Applicant's device is quite small and light, to make it easy for a worker to carry around. A preferred device weighs less than 2 ounces and incorporates a neodymium magnet that is 1-¼"×9/16"×⅛". He has found that a magnet this small (or of similar size) is sufficiently powerful to hold the zero hook in place when attracted to metal studs or nails or other ferrous material through drywall, in front, beside, above or below. Tangs 38 have been found to supply sufficient friction to secure zero hook 12 when engaged on wood, drywall, concrete, block or plastic. Of course, these are all non-cosmetic surfaces, which comprise the universe of the design applicability for applicant's device for the construction worker or home handyman.

Although only a preferred embodiment is shown and described, obvious modifications of this invention, which will become readily apparent to those skilled in the art, are contemplated and are covered by the following claims.

I claim:

1. A removable device for enhancing the operation and utility of a tape measure that has an angled zero hook at its distal end, comprising a flat base, a rare earth magnet secured to one side of the base, said base including at least two integral arms that grip an edge of the magnet, a spring clip extending from a bottom edge of the base and extending up the other side of the base and including a curved surface normally contacting said other side and providing a pocket having an entrance slot for insertion of the zero hook, said zero hook being clamped between the base and the spring clip when inserted through the entry slot into the pocket, said device thereby being selectively and easily manually attached to and removed from said zero hook.

2. The device of claim 1, wherein the base and spring clip comprise a single steel stamping.

3. The device of claim 2, wherein the magnet is rectangular, and the base includes four integral arms, each extending to grip an edge of the magnet.

4. The device of claim 1, wherein the rare earth magnet is a neodymium magnet.

5. The device of any of claims 1–4, including friction enhancing means which extend from the spring clip in a direction away from said magnet to enhance gripping of nonmetallic surfaces.

6. The device of claim 5, wherein the friction enhancing means are tangs.

* * * * *